(12) United States Patent
Konno et al.

(10) Patent No.: US 7,503,423 B2
(45) Date of Patent: Mar. 17, 2009

(54) ELECTRONIC APPARATUS

(75) Inventors: Toshio Konno, Akiruno (JP); Satoshi Kishikawa, Ome (JP); Koji Ariga, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 82 days.

(21) Appl. No.: 11/411,470

(22) Filed: Apr. 26, 2006

(65) Prior Publication Data

US 2006/0245155 A1 Nov. 2, 2006

(30) Foreign Application Priority Data

Apr. 28, 2005 (JP) ............................. 2005-133603

(51) Int. Cl.
*H05K 5/02* (2006.01)
*H04R 1/02* (2006.01)
*A47B 81/06* (2006.01)
*H05K 7/20* (2006.01)

(52) U.S. Cl. ....................... 181/199; 181/148; 381/333; 381/388; 361/683

(58) Field of Classification Search ................. 381/160, 381/345, 306, 333, 388; 181/155, 199, 148, 181/150; 361/683, 679, 686, 685
See application file for complete search history.

(56) References Cited

U.S. PATENT DOCUMENTS

| | | | |
|---|---|---|---|
| 2,872,997 A * | 2/1959 | Scheerbarth | ................. 181/155 |
| 5,691,880 A | 11/1997 | Seto et al. | |
| 5,732,140 A * | 3/1998 | Thayer | ........................ 381/300 |
| 5,808,861 A | 9/1998 | Nakajima et al. | |
| 5,825,614 A * | 10/1998 | Kim | ............................ 361/683 |
| 5,838,537 A * | 11/1998 | Lundgren et al. | ........... 361/683 |
| 5,847,922 A * | 12/1998 | Smith et al. | ................... 361/683 |
| 5,917,695 A * | 6/1999 | Youn | ............................ 361/683 |
| 5,969,940 A * | 10/1999 | Sano et al. | ..................... 361/687 |
| 6,134,332 A * | 10/2000 | Wiener | ........................ 381/160 |
| 6,148,089 A * | 11/2000 | Akino | .......................... 381/356 |
| 6,292,358 B1 * | 9/2001 | Lee et al. | ...................... 361/683 |
| 6,415,035 B1 * | 7/2002 | Shin et al. | ..................... 381/388 |
| 6,542,616 B1 * | 4/2003 | Nobuchi | ....................... 381/388 |
| 6,714,405 B2 * | 3/2004 | Jitsukawa | .................... 361/683 |
| 6,807,053 B2 * | 10/2004 | An et al. | ....................... 361/683 |
| 6,904,157 B2 * | 6/2005 | Shima | .......................... 381/388 |
| 6,910,549 B2 * | 6/2005 | Kung | ........................... 181/199 |
| 7,012,802 B2 * | 3/2006 | Nakajima et al. | ............ 361/683 |
| 7,061,751 B2 * | 6/2006 | Hamada et al. | .............. 361/679 |
| 2004/0240689 A1 * | 12/2004 | Miyamoto | .................... 381/306 |
| 2005/0018396 A1 | 1/2005 | Nakajima et al. | |
| 2006/0067557 A1 * | 3/2006 | Imamura | ...................... 381/388 |
| 2006/0215865 A1 * | 9/2006 | Kang et al. | .................. 381/333 |

(Continued)

FOREIGN PATENT DOCUMENTS

JP 2001-119779 4/2001

(Continued)

*Primary Examiner*—Edgardo San Martin
(74) *Attorney, Agent, or Firm*—Blakely, Sokoloff, Taylor & Zafman LLP

(57) ABSTRACT

A portable computer includes a speaker device and a first casing. The speaker device includes a speaker main body and a speaker housing for housing the speaker main body. The first casing has a bottom wall. The bottom wall has swelling portion which swells outward and contains at least part of the speaker housing.

18 Claims, 12 Drawing Sheets

U.S. PATENT DOCUMENTS

| | | | |
|---|---|---|---|
| 2007/0086612 A1* | 4/2007 | Nishibori et al. | 381/333 |
| 2007/0253591 A1* | 11/2007 | Popilek et al. | 381/388 |
| 2008/0062633 A1* | 3/2008 | Yamaguchi et al. | 361/683 |
| 2008/0080734 A1* | 4/2008 | Forth et al. | 381/386 |

FOREIGN PATENT DOCUMENTS

| | | |
|---|---|---|
| JP | 2004-056185 | 2/2004 |

* cited by examiner

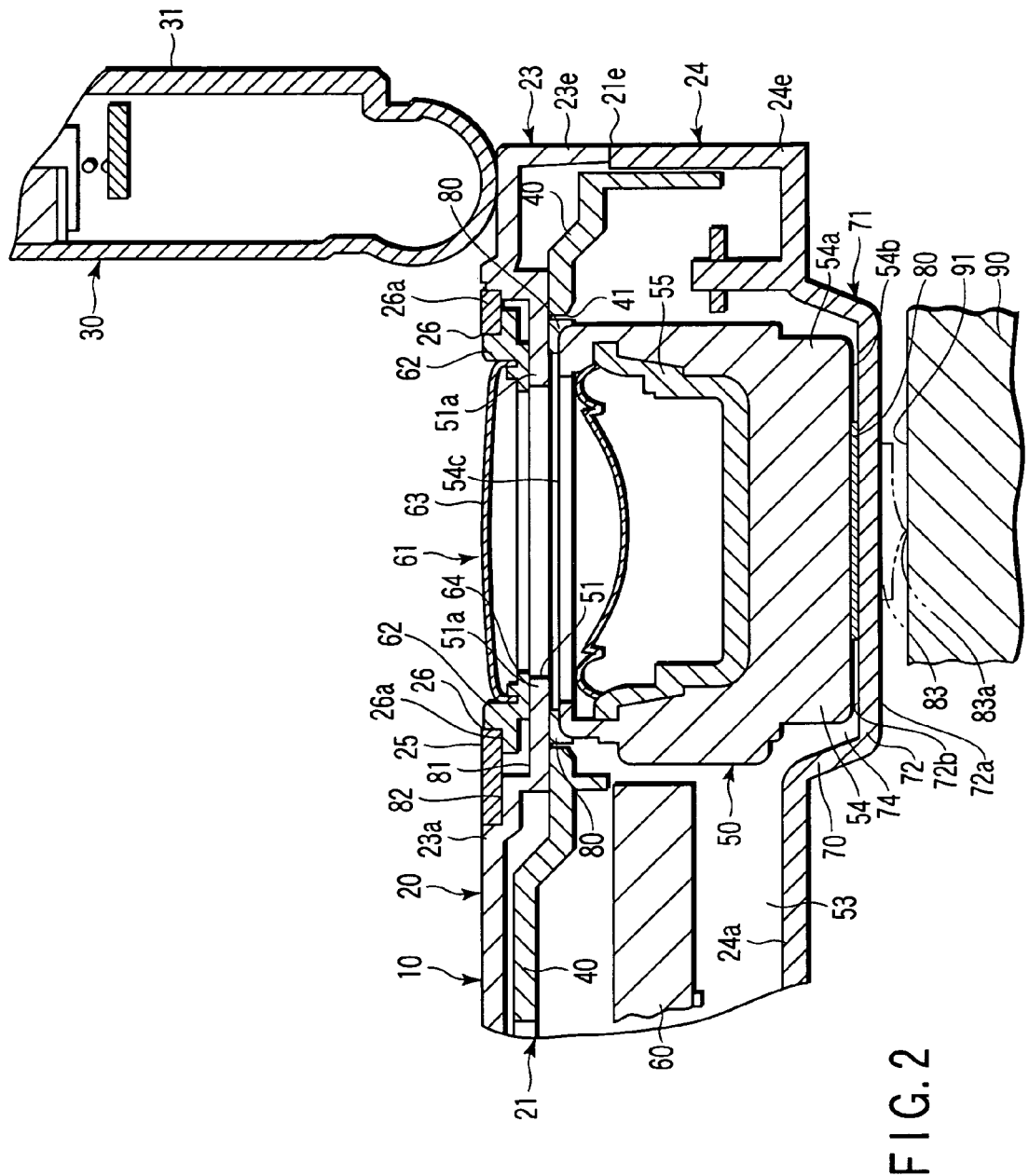
F I G. 2

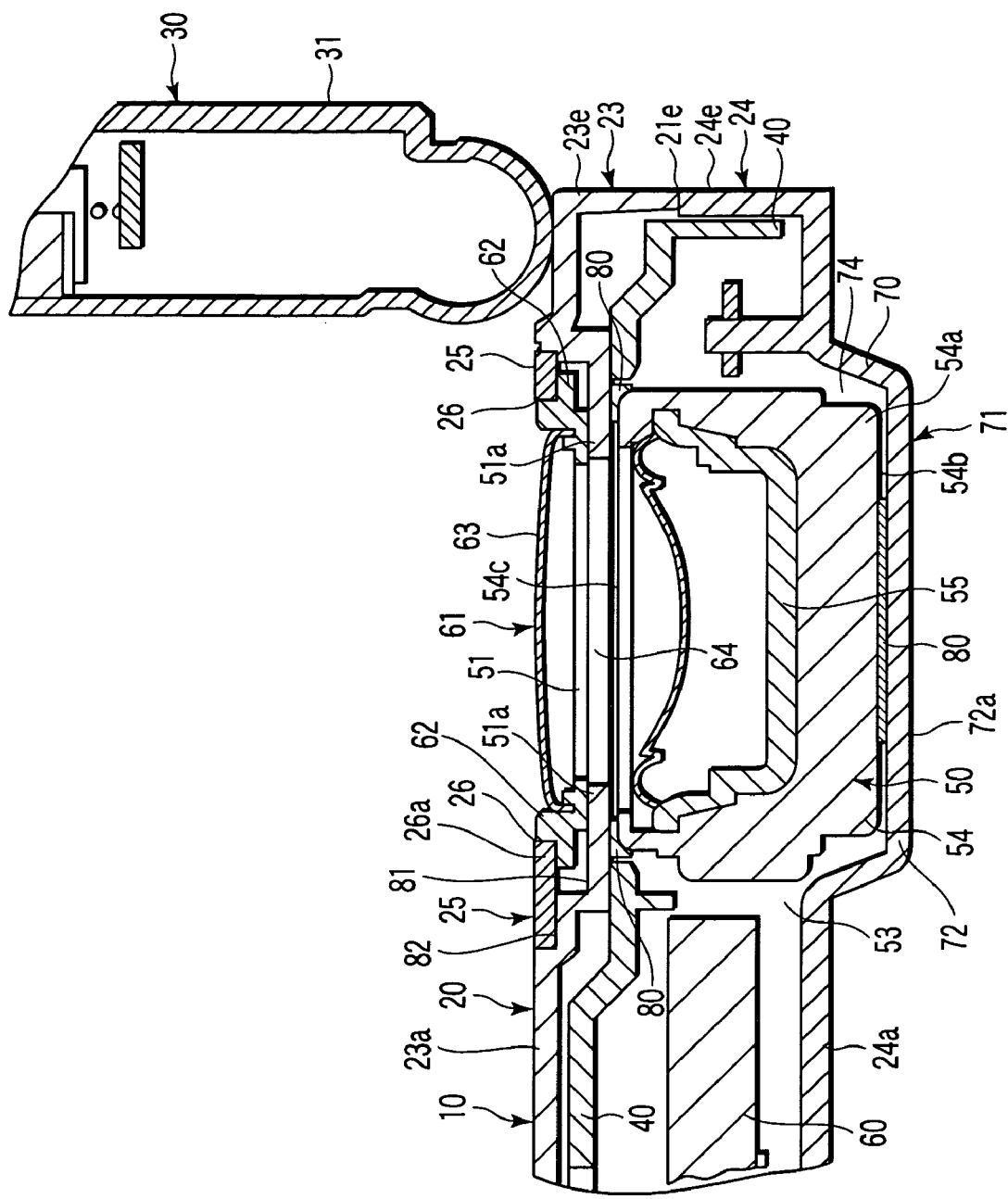
F I G. 6

ELECTRONIC APPARATUS

CROSS-REFERENCE TO RELATED APPLICATIONS

This application is based upon and claims the benefit of priority from Japanese Patent Application No. 2005-133603, filed Apr. 28, 2005, the entire contents of which are incorporated herein by reference.

BACKGROUND

1. Field

The present invention relates to an electronic apparatus having a casing for housing a speaker device.

2. Description of the Related Art

As an example of an electronic apparatus, there exists a portable computer in which a speaker device that reproduces sound, such as video or music, is housed in a casing.

A speaker device of this type has a speaker main body and a speaker housing for housing the speaker main body.

In a speaker device of this type, it is thought that the speaker housing is increased in size in order to improve sound quality.

On the other hand, for easy carrying of a portable computer, it is desirable that the portable computer be formed in compact form.

Therefore, if the speaker housing is increased in size in a height direction for sound quality improvement, the thickness of the portable computer increases, resulting in an increase in the size of the portable computer.

If the speaker housing is increased in size in a width direction, the area occupied by the speaker housing within the casing of the portable computer increases. In this case, in order to prevent interference between other components, such as a PCB (printed circuit board), housed in the casing of the portable computer and the speaker housing, the other components such as the PCB need to be reduced in size. It is not desirable to reduce the size of the other components such as the PCB.

In view of this, a speaker device is proposed which achieves sound quality improvement by changing the capacity of a speaker housing when a portable computer is in use. For example, Jpn. Pat. Appln. KOKAI Publication No. 2004-56185 discloses such a speaker device.

In the speaker device disclosed in Jpn. Pat. Appln. KOKAI Publication No. 2004-56185, however, part of the speaker housing projects over a plane where a keyboard is provided, because the capacity of the speaker housing is changed. Accordingly, the user may find the usability of the portable computer to be poor.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is a cross-sectional view of the portable computer taken along a line extending through a speaker device from the front to the rear of the portable computer;

FIG. 6 is a cross-sectional view of a portable computer according to a second embodiment of the present invention taken along a line extending through a speaker device from the front to the rear of the portable computer;

DETAILED DESCRIPTION

Various embodiments according to the invention will be described hereinafter with reference to the accompanying drawings. In general, according to one embodiment of the invention, an electronic apparatus includes a speaker device and a casing. The speaker device includes a speaker main body and a speaker housing which houses the speaker main body. The casing has a bottom wall. The bottom wall has a swelling portion which swells outward and contains at least part of the speaker housing.

With reference to FIGS. 1 to 5, an electronic apparatus according to a first embodiment of the present invention will be described using a portable computer 10 as an example.

Figure 1:
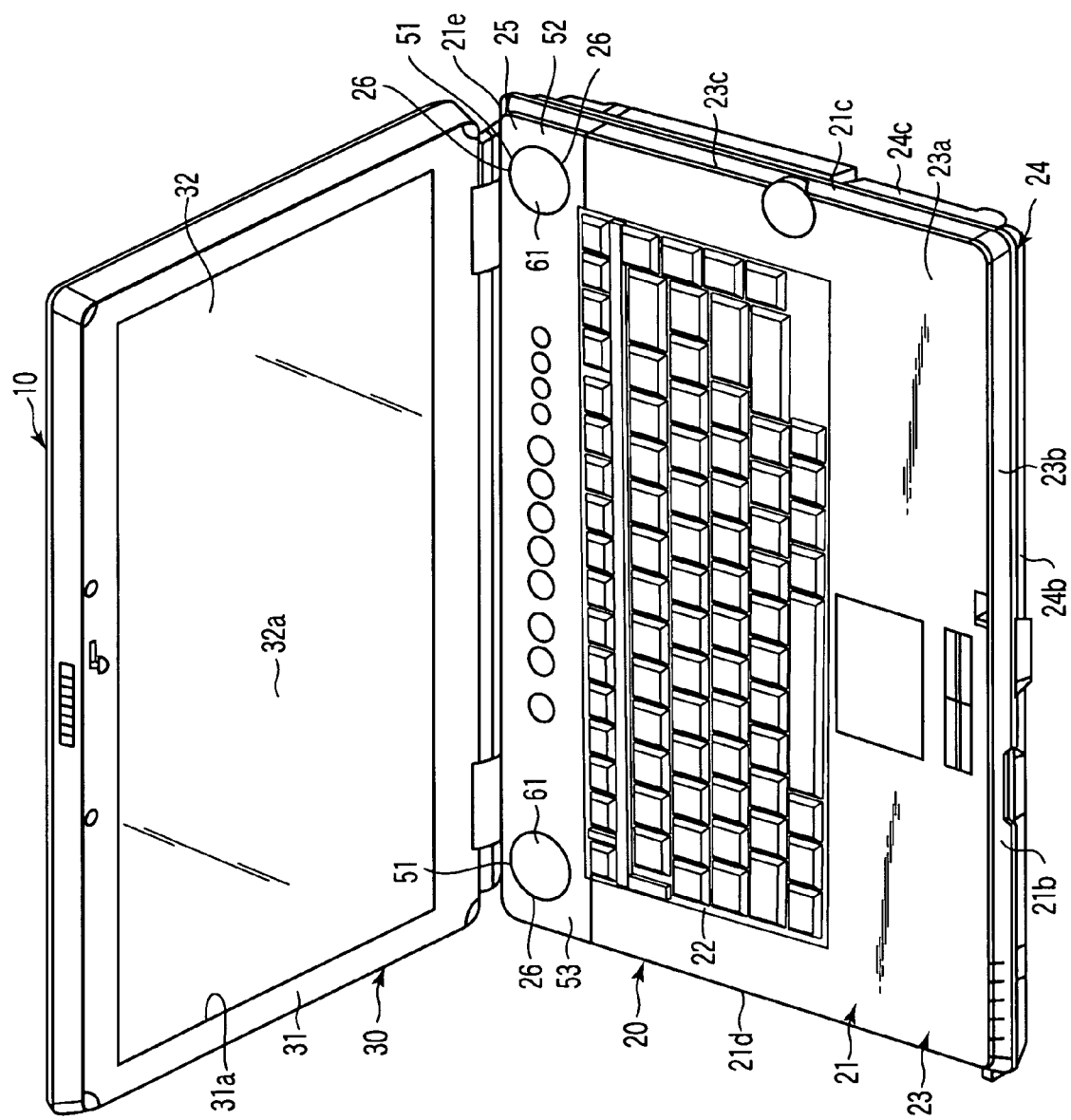
FIG. 1 is a perspective view of a portable computer according to a first embodiment of the present invention.

FIG. 1 is a diagram showing the portable computer 10. As shown in FIG. 1, the portable computer 10 includes a computer main body 20 and a display unit 30.

The computer main body 20 includes a first casing 21, a keyboard 22, speaker devices 50 and the like. The speaker device 50 is shown in FIG. 2. The first casing 21 is, as referred to in the present invention, an example of the casing. The first casing 21 has a flat box shape. Inside the first casing 21 houses components such as a hard disk drive and a PCB (printed circuit board) 60.

The first casing 21 has a cover portion 23, a base portion 24, and a keyboard retaining member 25.

The cover portion 23 forms a top portion of the first casing 21. The base portion 24 forms a bottom portion of the first casing 21.

Figure 3:
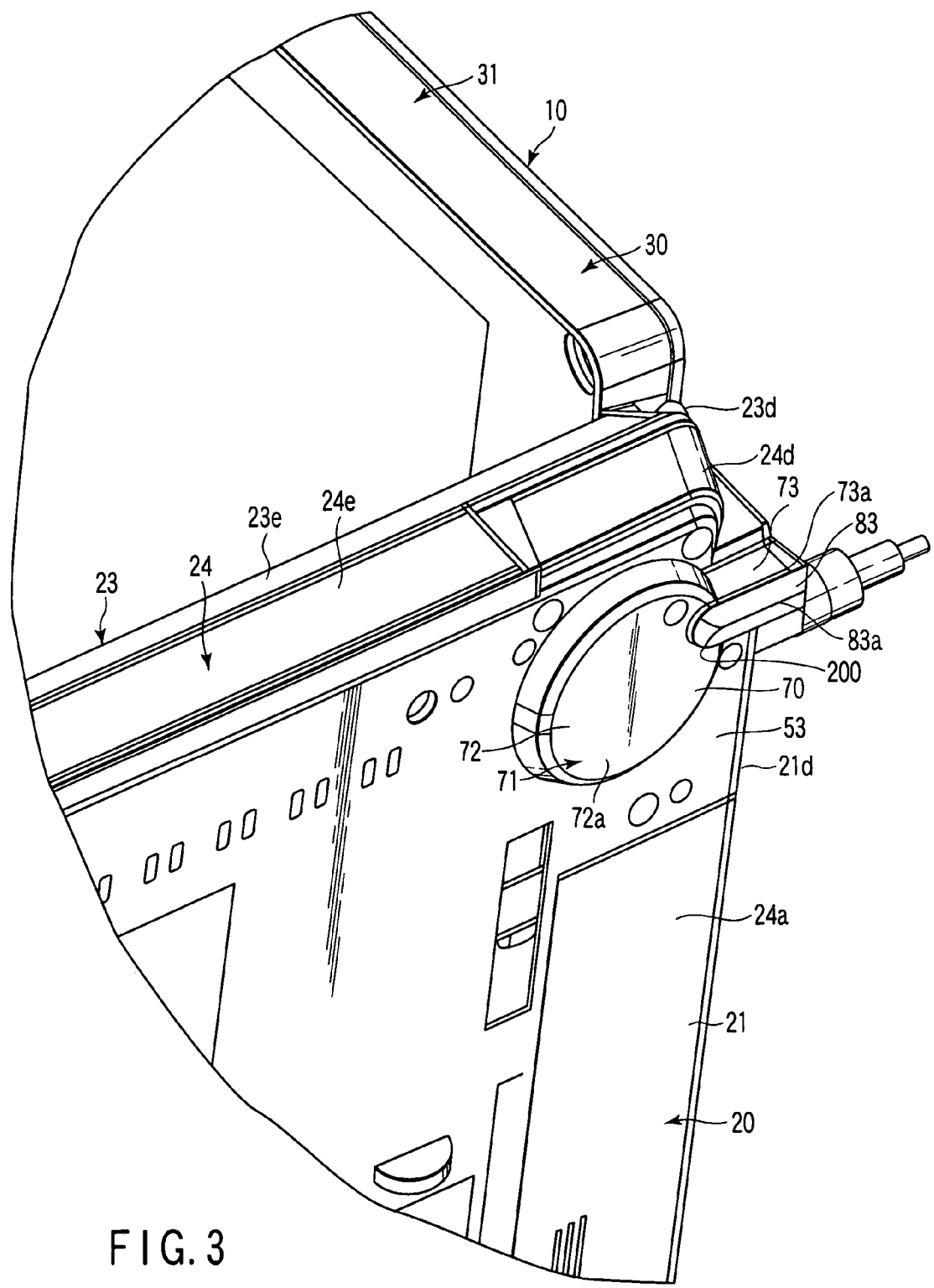
FIG. 3 is a perspective view of a bottom wall shown in FIG. 1.

The cover portion 23 opens downward. The cover portion 23 has a top wall 23a, a cover portion front wall 23b, a cover portion left wall 23c, a cover portion right wall 23d, and a cover portion rear wall 23e. The cover portion right wall 23d and the cover portion rear wall 23e are shown in FIG. 3.

On a top side of the top wall 23a is provided the keyboard 22. The keyboard 22 is provided substantially at the center of the top wall 23a. At a rear end portion of the top wall 23a is provided the keyboard retaining member 25. The keyboard retaining member 25 is overlaid on the rear end portion of the top wall 23a from above.

The cover portion front wall 23b is formed at a front rim of the top wall 23a and extends downward. The cover portion left wall 23c is formed at a left rim of the top wall 23a and extends downward. The cover portion right wall 23d is formed at a right rim of the top wall 23a and extends downward. The cover portion rear wall 23e is formed at a rear rim of the top wall 23a and extends downward.

The base portion 24 opens upward. The base portion 24 has a bottom wall 24a, a base portion front wall 24b, a base portion left wall 24c, a base portion right wall 24d, and a base portion rear wall 24e. The bottom wall 24a and the base portion rear wall 24e are shown in FIG. 2. The base portion front wall 24b is shown in FIG. 3.

The base portion front wall 24b is formed at a front rim of the bottom wall 24a and extends upward. The base portion left wall 24c is formed at a left rim of the bottom wall 24a and extends upward. The base portion right wall 24d is formed at a right rim of the bottom wall 24a and extends upward. The base portion rear wall 24e is formed at a rear rim of the bottom wall 24a and extends upward.

The first casing 21 is formed by the cover portion 23 and the base portion 24 stacking on top of each other. The cover portion front wall 23b and the base portion front wall 24b stack on top of each other in an up-down direction, to form a front wall 21b of the first casing 21.

The cover portion left wall 23c and the base portion left wall 24c stack on top of each other in the up-down direction, to form a left wall 21c of the first casing 21. The cover portion right wall 23d and the base portion right wall 24d stack on top of each other in the up-down direction, to form a right wall 21d of the first casing 21. The cover portion rear wall 23e and the base portion rear wall 24e stack on top of each other in the up-down direction, to form a rear wall 21e of the first casing 21.

The display unit 30 has a second casing 31 and a liquid crystal display panel 32. The liquid crystal display panel 32 is housed in the second casing 31. The liquid crystal display panel 32 has a screen 32a for displaying an image. The screen 32a is exposed to the outside from the second casing 31 through an opening portion 31a formed in the front of the second casing 31.

The second casing 31 is supported on a rear end portion of the first casing 21 via a hinge 40. A part of the hinge 40 is shown in FIG. 2. The display unit 30 is rotatable between a closed position and an opened position. The closed position is such that the display unit 30 lies on the computer main body 20 so as to cover the keyboard 22 from above. The opened position is such that the display unit 30 rises from the computer main body 20 such that the keyboard 22 and the screen 32a are exposed.

The speaker devices 50 are housed in the first casing 21. For example, the speaker devices 50 are provided in a pair. The top wall 23a is provided with through holes 51 through which sound emitted from the speaker devices 50 passes.

The speaker devices 50 are disposed on both sides of the rear end portion of the first casing 21, respectively, so as to avoid interference with the keyboard 22 provided on the top wall 23a.

Thus, the speaker devices 50 are disposed at a rear-left side portion 52 and a rear-right side portion 53 of the first casing 21, respectively. The through holes 51 are provided in locations of the top wall 23a corresponding to the rear-left side portion 52 and the rear-right side portion 53, respectively.

The keyboard retaining member 25 is provided at the rear end portion of the top wall 23a. Hence, the keyboard retaining member 25 also is provided with through holes 26 through which sound emitted from the speaker devices 50 passes.

The speaker device 50 provided at the rear-left side portion 52 of the first casing 21 may be the same as the speaker device 50 provided at the rear-right side portion 53 of the first casing 21. In addition, the retaining structure of the speaker device 50 provided at the rear-left side portion 52 of the first casing 21 may be the same as that of the speaker device 50 provided at the rear-right side portion 53 of the first casing 21. Thus, the retaining structure of the speaker device 50 provided at the rear-right side portion 53 will be described as a representative example.

FIG. 2 is a cross-sectional view of the portable computer 10 taken along a line extending through the speaker device 50 from the front to the rear of the portable computer 10. FIG. 3 is a perspective view of a part of the bottom wall 24a of the portable computer 10 where the speaker device 50 provided at the rear-right side portion 53 is present, as viewed from the outside.

As shown in FIG. 2, the speaker device 50 has a speaker housing 54 and a speaker main body 55. The speaker main body 55 is housed in the speaker housing 54.

As shown in FIGS. 2 and 3, a swelling portion 71 is formed at a location 70 of the bottom wall 24a where the speaker device 50 is to be disposed. The swelling portion 71 is formed by part of the bottom wall 24a swelling outward. Thus, the swelling portion 71 has a depression shape which opens upward.

Note that although in the present embodiment the locations 70 where the speaker devices 50 are to be disposed are present at part of the first casing 21, i.e., the rear-left side portion 52 and the rear-right end portion 53, the present invention is not limited thereto. The locations where the speaker devices 50 are to be disposed can be arbitrarily set.

As shown in FIG. 3, the swelling portion 71 has a swelling portion main body 72 and a projection portion 73 that projects from the swelling portion main body 72 toward, for example, the right side.

As shown in FIG. 2, the swelling portion main body 72 has a size which allows part of a bottom portion 54a of the speaker housing 54 to be housed in the swelling portion main body 72. A bottom of the speaker housing 54 refers to an underside 54b of the speaker housing 54 which is the opposite side of where sound is emitted.

A cushioning material 80 is provided between an inner surface of the swelling portion main body 72 and the speaker housing 54. The cushioning material 80 absorbs vibration of the speaker device 50.

Figure 4:
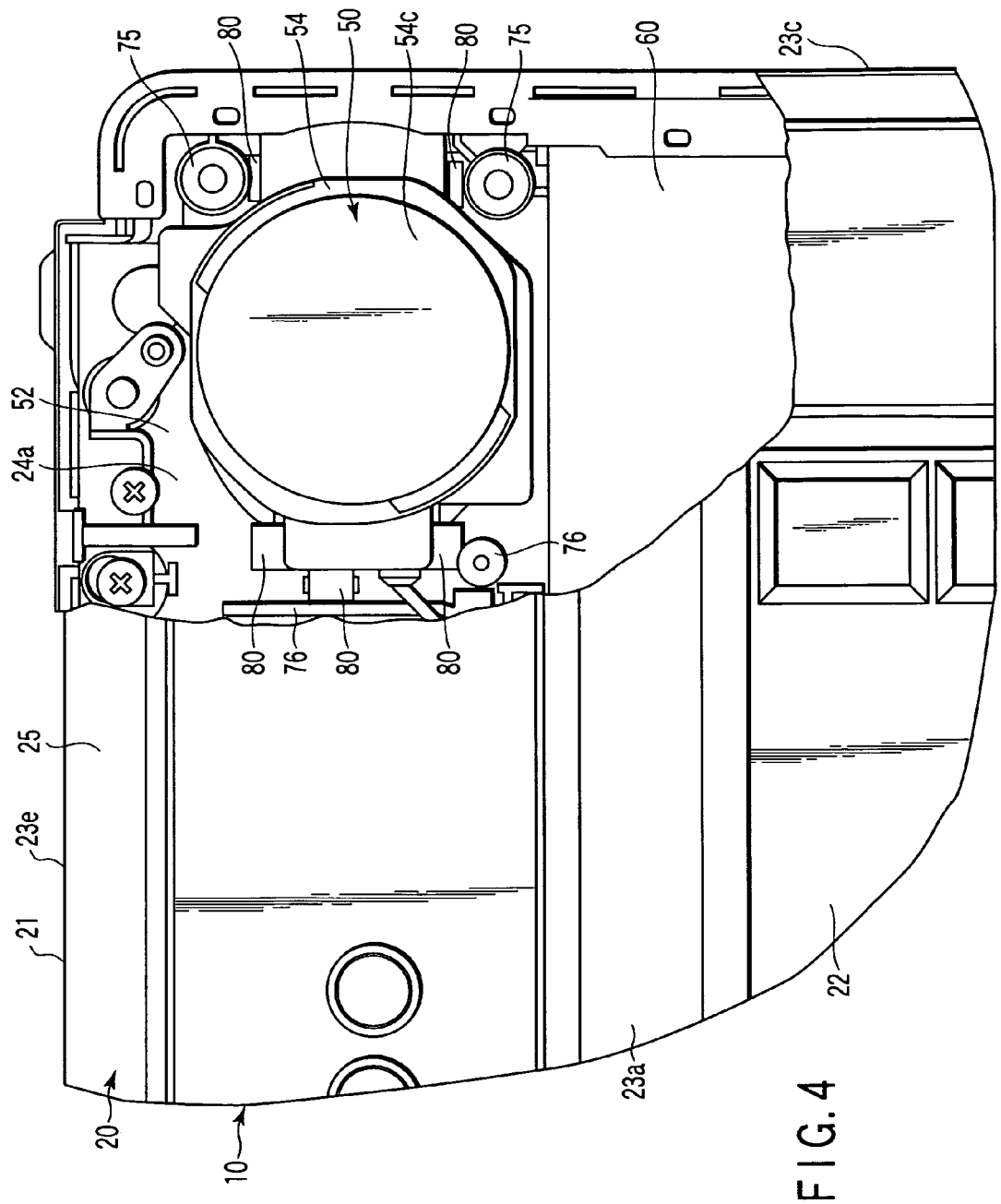
FIG. 4 is a plan view of the speaker device disposed at a rear-left side portion shown in FIG. 1, in which part of a top wall and part of a keyboard retaining member are cut away.

The speaker housing 54 is disposed in the first casing 21 such that part of the bottom portion 54a of the speaker housing 54 is housed in an inner space 74 of the swelling portion main body 72. FIG. 4 is a plan view, in which the top wall 23a and the keyboard retaining member 25 are partially cut away, showing a state in which part of the bottom portion 54a of the speaker device 50 is housed in the inner space 74 of the swelling portion main body 72. Note that although FIG. 4 shows the vicinity of the speaker device 50 disposed at the rear-left side portion 52, the vicinity of the speaker device 50 disposed at the rear-right side portion 53 may be substantially the same.

As shown in FIGS. 2 and 4, the PCB 60 is large in size such that the PCB 60 reaches the vicinity of the speaker device 50.

As shown in FIG. 4, in the vicinity of the swelling portion 71 of the first casing 21, there are provided boss portions 75 through which bolts, for example, that engage the cover portion 23 and the base portion 24 pass, a vertical wall portion 76 used to house other components, such as the PCB 60, in the first casing 21, and the like. The boss portions 75 and the vertical wall portion 76 can be provided to either the base portion 24 or the cover portion 23.

A cushioning material 80 is provided between the boss portion 75 and the speaker housing 54 and between the vertical wall portion 76 and the speaker housing 54. As shown in FIG. 2, the hinge 40 is located above the speaker housing 54. The hinge 40 has provided therein a through hole 41 so as to accommodate the speaker housing 54.

Now, the through holes 51 and 26 provided in the top wall 23a and the keyboard retaining member 25 will be described. The through hole 51 provided in the top wall 23a is smaller than a top side 54c of the speaker housing 54. Thus, a rim portion 51a of the through hole 51 provided in the top wall 23a overlaps part of the top side 54c of the speaker housing 54 in the up-down direction.

Figure 5:
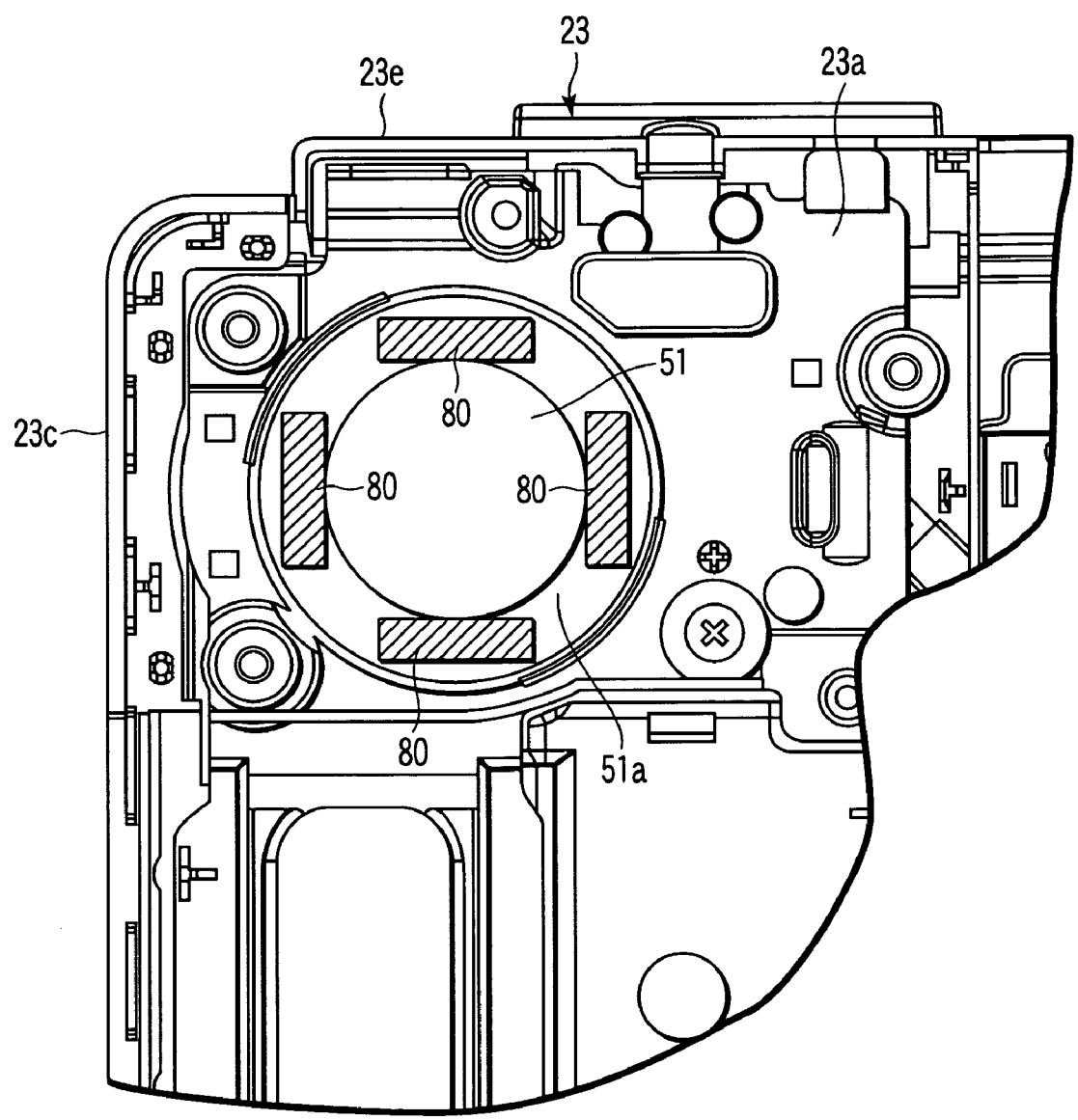
FIG. 5 is a plan view showing the inside of a cover portion shown in FIG. 4.

FIG. 5 is a plan view showing the inside of the cover portion 23. As shown in FIGS. 2 and 5, cushioning materials 80 are provided at the rim portion 51a of the through hole 51 provided in the top wall 23a. The top wall 23a retains the position of the speaker housing 54 by holding down, through the cushioning materials 80, the speaker housing 54 from the above.

As shown in FIG. 2, a covering member 61 for covering the through hole 51 is provided at the rim portion 51a of the through hole 51 provided in the top wall 23a. The covering member 61 has a frame portion 62 and a mesh portion 63. The frame portion 62 overlies the rim portion 51a of the through hole 51 from above. The frame portion 62 has a hole 64 on an inner side thereof. The hole 64 faces the top side 54c of the speaker housing 54. The mesh portion 63 covers the hole 64 provided on the inner side of the frame portion 62. The mesh portion 63 is mesh-like.

The covering member 61 thus formed is overlaid, from above, on the rim portion 51a of the through hole 51 provided in the top wall 23a. By this, the through hole 51 is covered by the covering member 61.

The through hole 26 provided in the keyboard retaining member 25 has a size which allows a rim portion 26a of the through hole 26 to overlie part of an exterior of the frame portion 62 of the covering member 61 in the up-down direction. Accordingly, when the keyboard retaining member 25 is overlaid on the top wall 23a, the keyboard retaining member 25 holds down the frame portion 62 of the covering member 61. By this, the covering member 61 is retained between the top wall 23a and the keyboard retaining member 25.

The top wall 23a has a two-step-down shape so as to accommodate the keyboard retaining member 25 and the covering member 61. The covering member 61 is provided on a first step surface 81 of the top wall 23a. The keyboard retaining member 25 is provided on a second step surface 82 of the top wall 23a. The depth of the second step of the top wall 23a is substantially the same as the thickness of the keyboard retaining member 25. Thus, a top side of the top wall 23a is substantially flush with a top side of the keyboard retaining member 25.

As shown in FIG. 3, an underside 73a of the projection portion 73 and an underside 72a of the swelling portion main body 72 are, for example, substantially in the same plane. A rubber foot 83 is provided on the underside 73a of the projection portion 73. The rubber foot 83 also covers a part 200 of the underside 72a of the swelling portion main body 72.

In FIG. 2, the rubber foot 83 is shown by a dash-double-dotted line. As shown in FIG. 2, in the present embodiment, the portable computer 10 is placed on a top side 91 of a table 90, and a tip 83a of the rubber foot 83 facing the top side 91 projects most significantly toward the top side 91 of the table 90.

Therefore, when the portable computer 10 is placed on the top side 91 of the table 90, the rubber foot 83 abuts on the top side 91. That is, the swelling portion 71 functions as a foot portion of the portable computer 10. The rubber foot 83 has an anti-slip function. The table 90 is, as referred to in the present invention, an example of the mounting portion.

Note that the rubber foot 83 should project most significantly toward the top side 91 of the table 90. Hence, the underside 73a of the projection portion 73, for example, does not need to project most significantly toward the top side 91.

In this case, with the height of the rubber foot 83 being added to the underside 73a, the tip 83a of the rubber foot 83 projects most significantly toward the top side 91.

The retaining structure of the speaker device 50 provided at the rear-left side portion 52 is also substantially the same as the retaining structure of the speaker device 50 provided at the rear-right side portion 53.

In the portable computer 10 thus configured, part of the speaker housing 54 is housed in the inner space 74 of the swelling portion main body 72. Therefore, the height of the speaker housing 54 can be increased by an amount equal to the depth of the inner space 74 of the swelling portion main body 72. That is, the capacity of the speaker housing 54 can be increased. Accordingly, sound quality is improved.

Furthermore, portions of the first casing 21, other than the swelling portion 71, are not increased in size. Hence, without increasing the overall size of the first casing 21, the first casing 21 can house the speaker housing 54 with a large capacity.

The swelling portion 71 swells outward from the bottom wall 24a. Thus, even when the first casing 21 houses the speaker housing 54 with a large capacity, the top wall 23a does not swell upward. Hence, the usability of the portable computer 10 is not impaired.

Accordingly, the portable computer 10 achieves sound quality improvement and good usability while suppressing an increase in the size of the first casing 21.

Since the swelling portion 71 is formed using part of the bottom wall 24a, the swelling portion 71 can be easily formed.

The swelling portion 71 functions as a foot portion of the portable computer 10. Since a foot portion does not need to be additionally provided to the bottom wall 24a, the configuration of the portable computer 10 is simplified.

The cushioning material 80 is provided between the speaker housing 54 and an inner surface 72b of the swelling portion main body 72. The cushioning material 80 is provided between the speaker housing 54 and the vertical wall portion 76. The cushioning material 80 is provided between the speaker housing 54 and the boss portions 75.

These cushioning materials 80 absorb vibration of the speaker housing 54. By providing the cushioning materials 80 between the first casing 21 and the speaker housing 54 in this manner, the vibration of the speaker housing 54 is inhibited from being transmitted to the first casing 21.

Now, with reference to FIG. 6, an electronic apparatus according to a second embodiment of the present invention will be described using a portable computer 10 as an example. Note that the configurations having the same functions as those in the first embodiment are denoted by the same reference numerals and the description thereof is not repeated.

In the present embodiment, the height of a speaker housing 54 is different from that in the first embodiment. Other structures may be the same as those in the first embodiment. The difference will be described in detail.

FIG. 6 is a cross-sectional view of the portable computer 10 of the second embodiment taken along a line extending through a speaker device 50 from the front to the rear of the portable computer 10. As shown in FIG. 6, in the present embodiment, the height of the speaker housing 54 is not increased according to the depth of an inner space 74 of a swelling portion main body 72. When the height of the speaker housing 54 is not increased according to the depth of the inner space 74 of the swelling portion main body 72, i.e., when the capacity of the speaker housing 54 is not increased, the length of the speaker housing 54 above an inner surface of a bottom wall 24a is shortened. Accordingly, the height of a first casing 21 can be reduced.

Therefore, when the height of the speaker housing 54 is not increased, the height of the first casing 21 can be reduced. That is, the portable computer 10 can be reduced in size.

Now, with reference to FIG. 7, an electronic apparatus according to a third embodiment of the present invention will be described using a portable computer 10 as an example. Note that the configurations having the same functions as those in the first embodiment are denoted by the same reference numerals and the description thereof is not repeated.

In the present embodiment, the height of a speaker housing 54 is different from that in the first embodiment. Other structures may be the same as those in the first embodiment. The difference will be described in detail.

Figure 7:
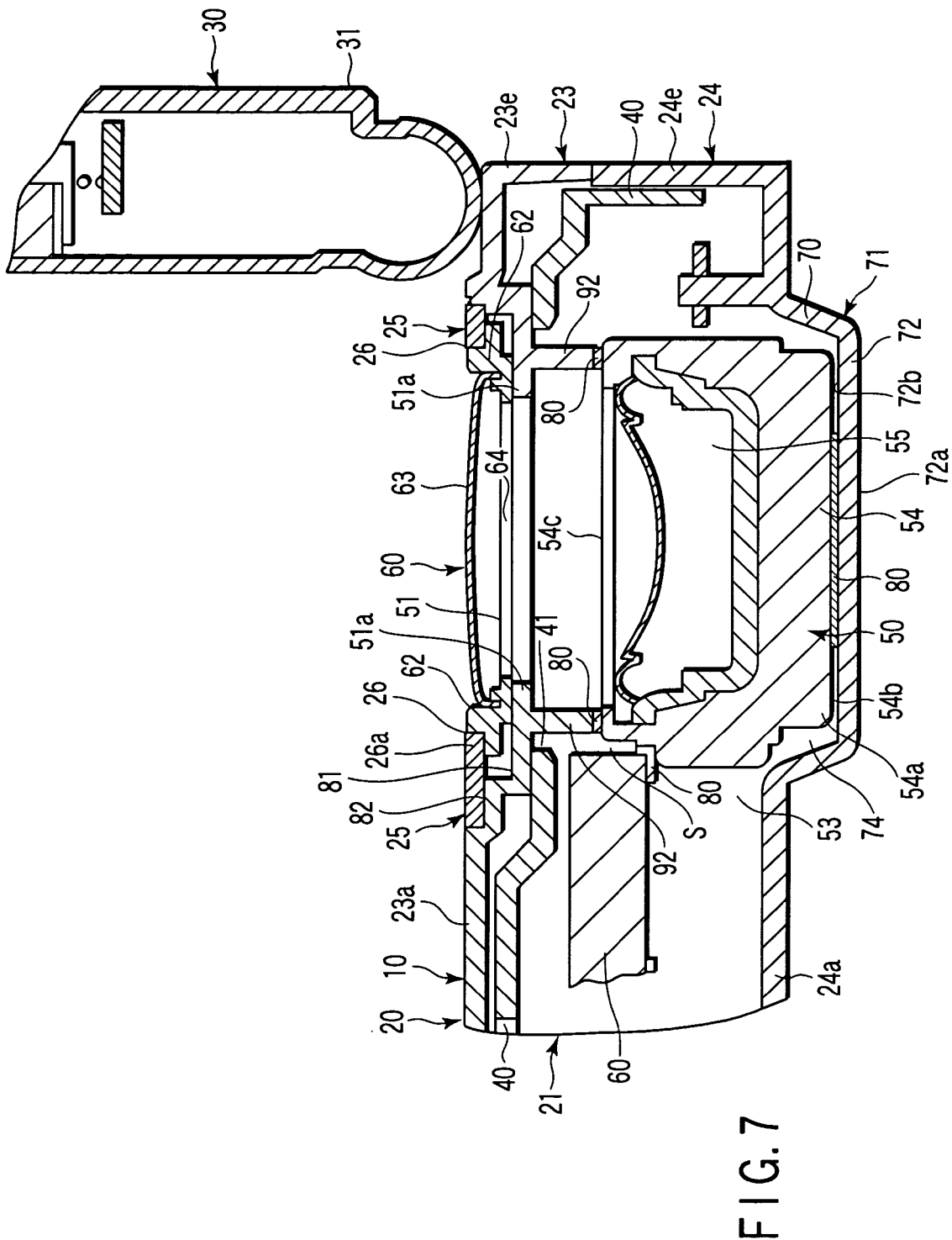
FIG. 7 is a cross-sectional view of a portable computer according to a third embodiment of the present invention taken along a line extending through a speaker device from the front to the rear of the portable computer.

FIG. 7 is a cross-sectional view of the portable computer 10 of the third embodiment taken along a line extending through a speaker device 50 from the front to the rear of the portable computer 10. As shown in FIG. 7, in the present embodiment, the height of the speaker housing 54 is not increased according to the depth of an inner space 74 of a swelling portion main body 72. When the height of the speaker housing 54 is not increased, a clearance S is provided between the speaker housing 54 and a top wall 23a. Thus, the size of a PCB 60 can be increased to the point that part of the PCB 60 enters into the clearance S.

In such a case, boss portions 92 extending to a top side 54c of the speaker housing 54 are formed on the top wall 23a. Then, a cushioning material 80 is provided between each of the boss portions 92 and the speaker housing 54.

In addition, a cushioning material 80 is provided between the PCB 60 and the speaker housing 54. Note that the component to enter the clearance S is not limited to the PCB 60.

Now, with reference to FIGS. 8 and 9, an electronic apparatus according to a fourth embodiment of the present invention will be described using a portable computer 10 as an example. Note that the configurations having the same functions as those in the first embodiment are denoted by the same reference numerals and the description thereof is not repeated.

In the present embodiment, the location where a rubber foot 83 is provided is different from that in the first embodiment. Other structures may be the same as those in the first embodiment. The difference will be described in detail.

Figure 8:
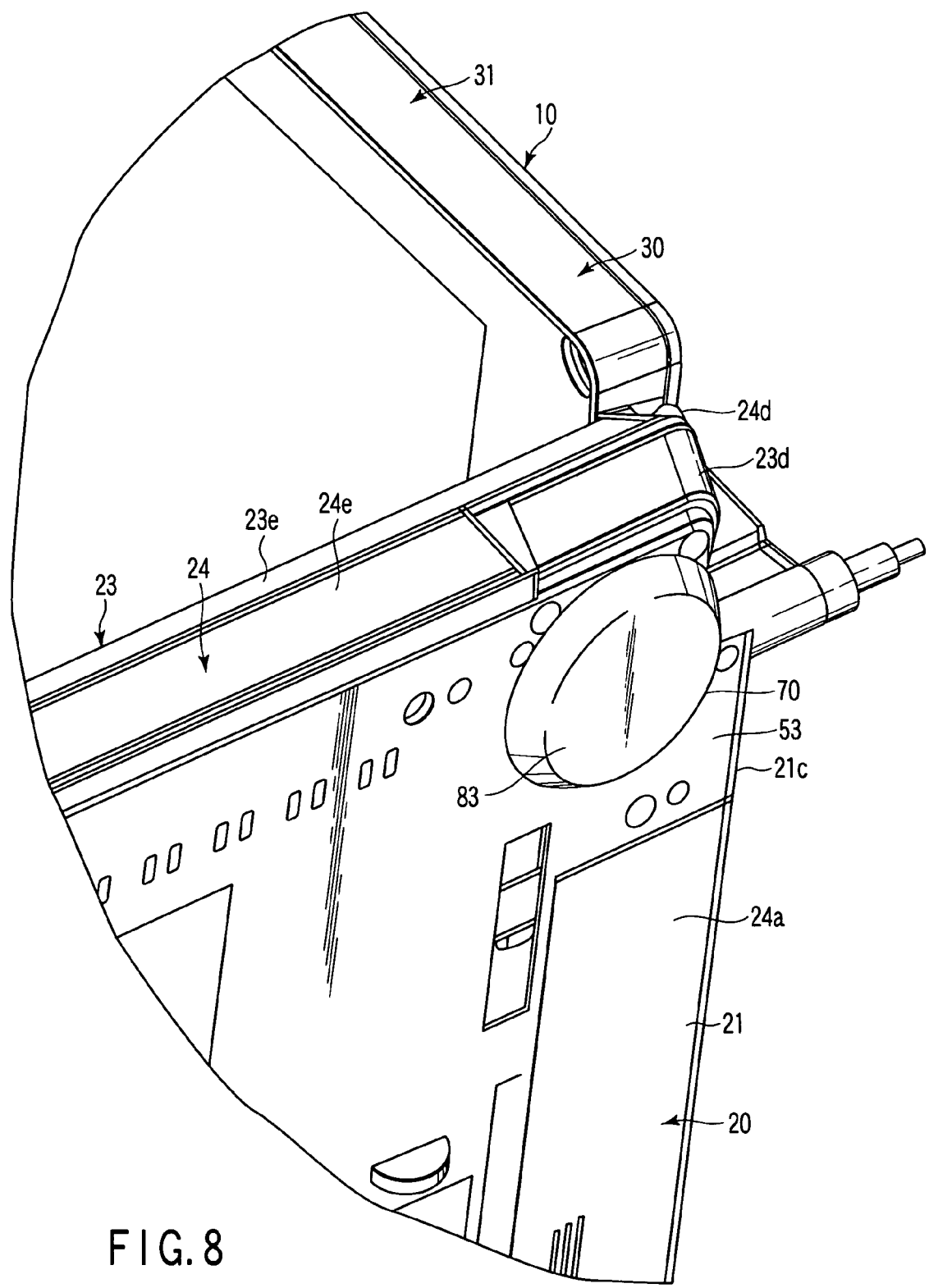
FIG. 8 is a perspective view of a bottom wall of a first casing of a portable computer according to a fourth embodiment of the present invention.

FIG. 8 is a perspective view of the portable computer 10 of, showing a part of the bottom wall 24a of the portable computer 10, where a speaker device 50 is provided at a rear-right portion 53.

Figure 9:
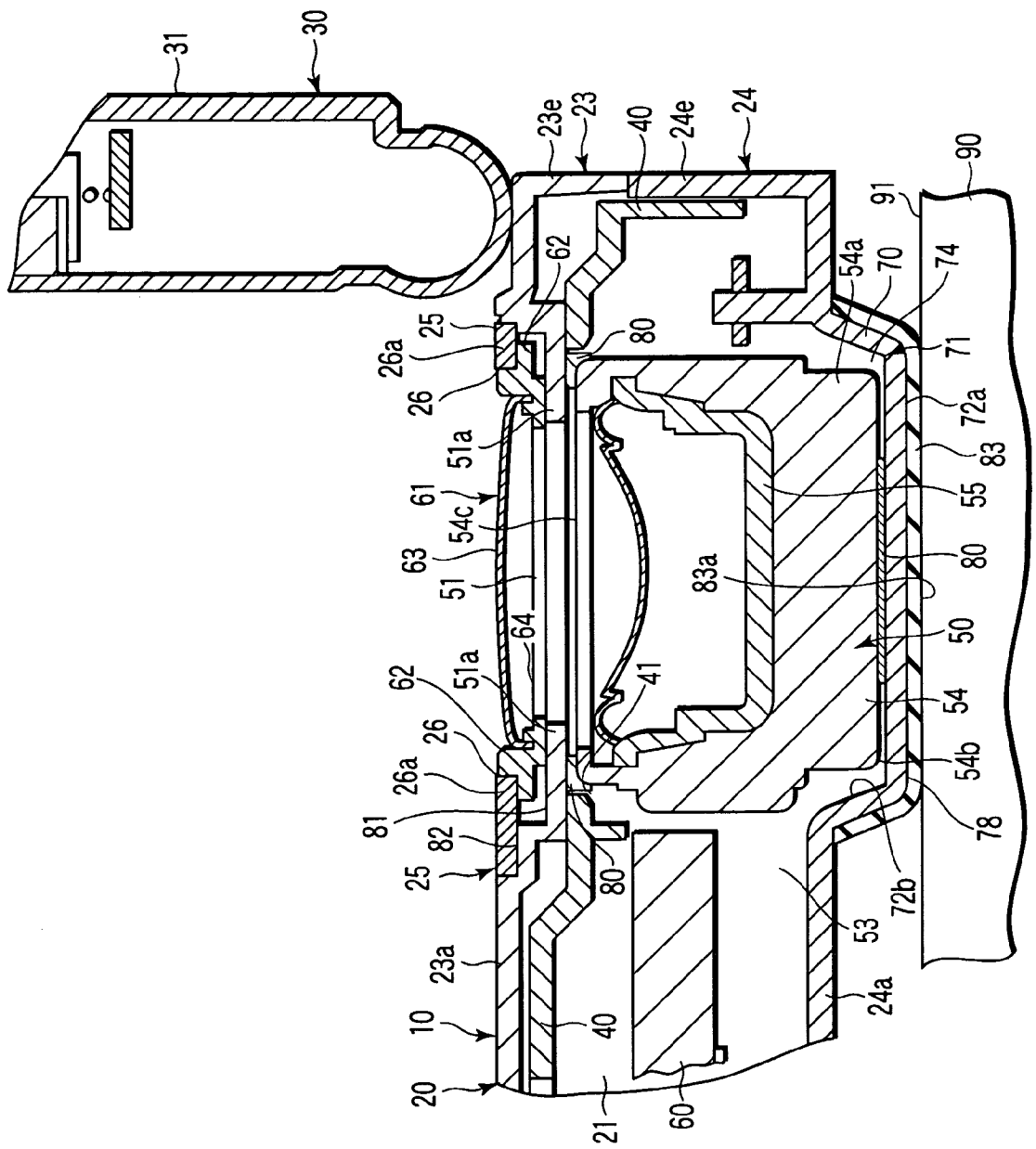
FIG. 9 is a cross-sectional view of the portable computer shown in FIG. 8 taken along a line extending through a speaker device from the front to the rear of the portable computer.

FIG. 9 is a cross-sectional view of the portable computer 10 of the fourth embodiment taken along a line extending through the speaker device 50 from the front to the rear of the portable computer 10. As shown in FIGS. 8 and 9, in the present embodiment, the rubber foot 83 is provided over substantially the entire area of an outer peripheral surface 78 of a swelling portion 71. In the present embodiment, it is not necessary to form a projection portion 73.

In the present embodiment, the same advantageous effects as those obtained in the first embodiment can be obtained. Furthermore, with the rubber foot 83 being provided over substantially the entire area of the outer peripheral surface 78 of the swelling portion 71, the rubber foot 83 also effectively absorbs vibration of the speaker device 50.

Now, with reference to FIG. 10, an electronic apparatus according to a fifth embodiment of the present invention will be described using a portable computer 10 as an example. Note that the configurations having the same functions as those in the first embodiment are denoted by the same reference numerals and the description thereof is not repeated.

In the present embodiment, the structure of a swelling portion 71 is different from that in the first embodiment. Other structures may be the same as those in the first embodiment. The difference will be described in detail.

Figure 10:
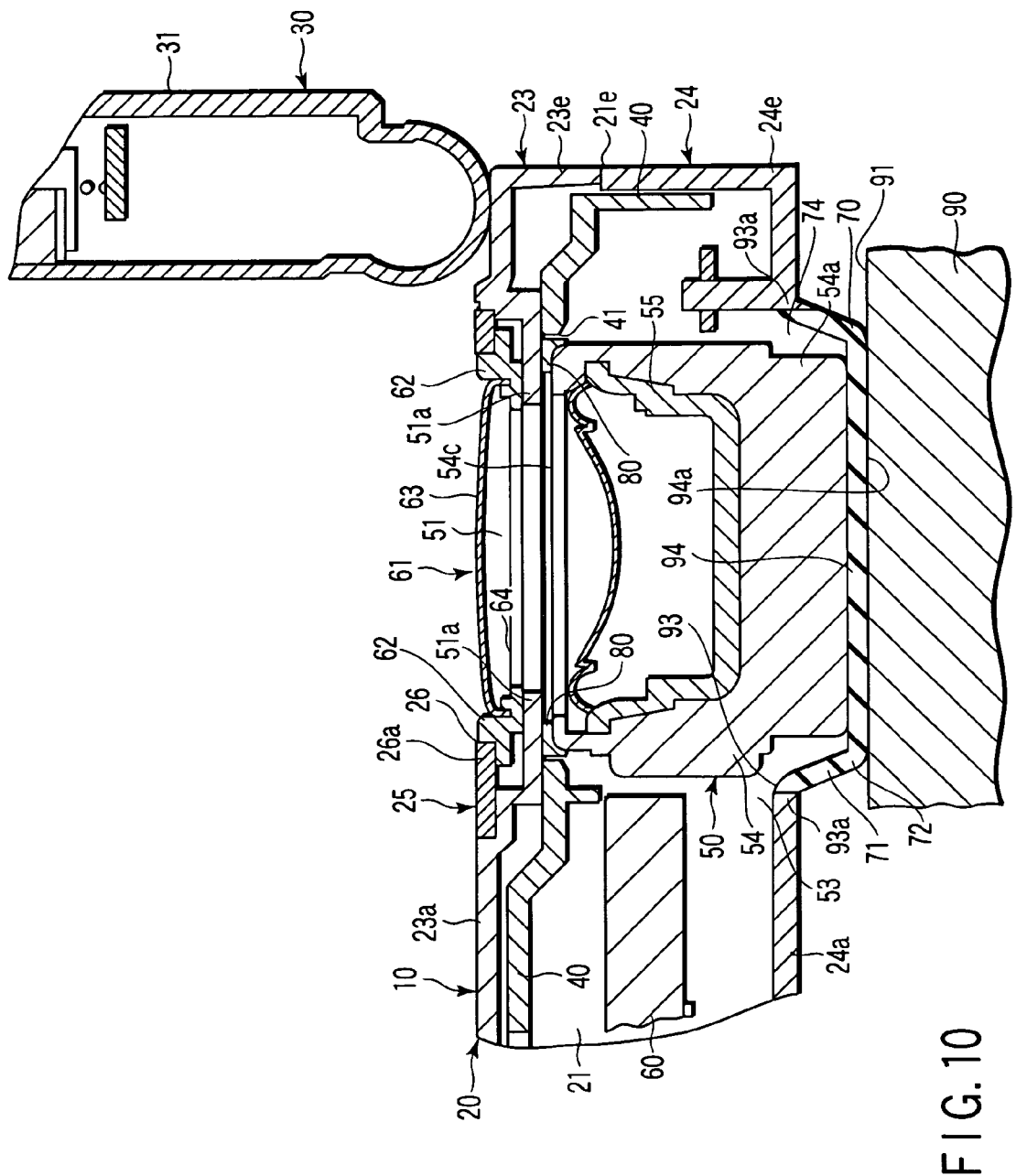
FIG. 10 is a cross-sectional view of a portable computer according to a fifth embodiment of the present invention taken along a line extending through a speaker device from the front to the rear of the portable computer.

FIG. 10 is a cross-sectional view of the portable computer 10 of the fifth embodiment taken along a line of extending through a speaker device 50 from the front to the rear of the portable computer 10. As shown in FIG. 10, a through hole 93 is provided at a location 70 of a bottom wall 24a where the speaker device 50 is to be formed.

A swelling member 94 is provided at a rim portion 93a of the through hole 93. The swelling member 94 has a depression shape which opens upward. The swelling member 94 is made of a rubber and has a size which covers the through hole 93. The swelling member 94 swells outward from the bottom wall 24a.

The swelling portion 71 of the present embodiment is formed by providing the swelling member 94 at the rim portion 93a of the through hole 93 provided in the bottom wall 24a. Part of a speaker housing 54 is housed in an inner side of the swelling member 94. Note that the inner side of the swelling member 94 refers to an inner space 74.

When the portable computer 10 is placed on a top side 91 of a table 90, an underside 94a of the swelling member 94 projects most significantly toward the top side 91. Note that the underside 94a of the swelling member 94 refers to an underside of the swelling portion 71.

When the portable computer 10 is placed on the top side 91, the underside 94a of the swelling member 94 abuts on the top side 91 of the table 90. That is, the swelling member 94 functions as a foot portion of the portable computer 10.

In addition, since the swelling member 94 is made of a rubber, the swelling member 94 has a function as a cushioning material.

In the present embodiment, since the swelling member 94 is made of a rubber, a cushioning material is not required between the speaker housing 54 and the swelling portion 71, resulting in a reduction in the number of components.

Furthermore, since the swelling portion 71 functions as a foot portion, a foot portion does not need to be additionally formed on the bottom wall 24a. Accordingly, the structure of the portable computer 10 is simplified.

Now, with reference to FIGS. 11 and 12, an electronic apparatus according to a sixth embodiment of the present invention will be described using a portable computer 10 as an example. Note that the configurations having the same functions as those in the first embodiment are denoted by the same reference numerals and the description thereof is not repeated.

The present embodiment is different from the first embodiment in that a foot portion 95 is formed separately from a swelling portion 71. Other structures may be the same as those in the first embodiment. The difference will be described in detail.

Figure 11:
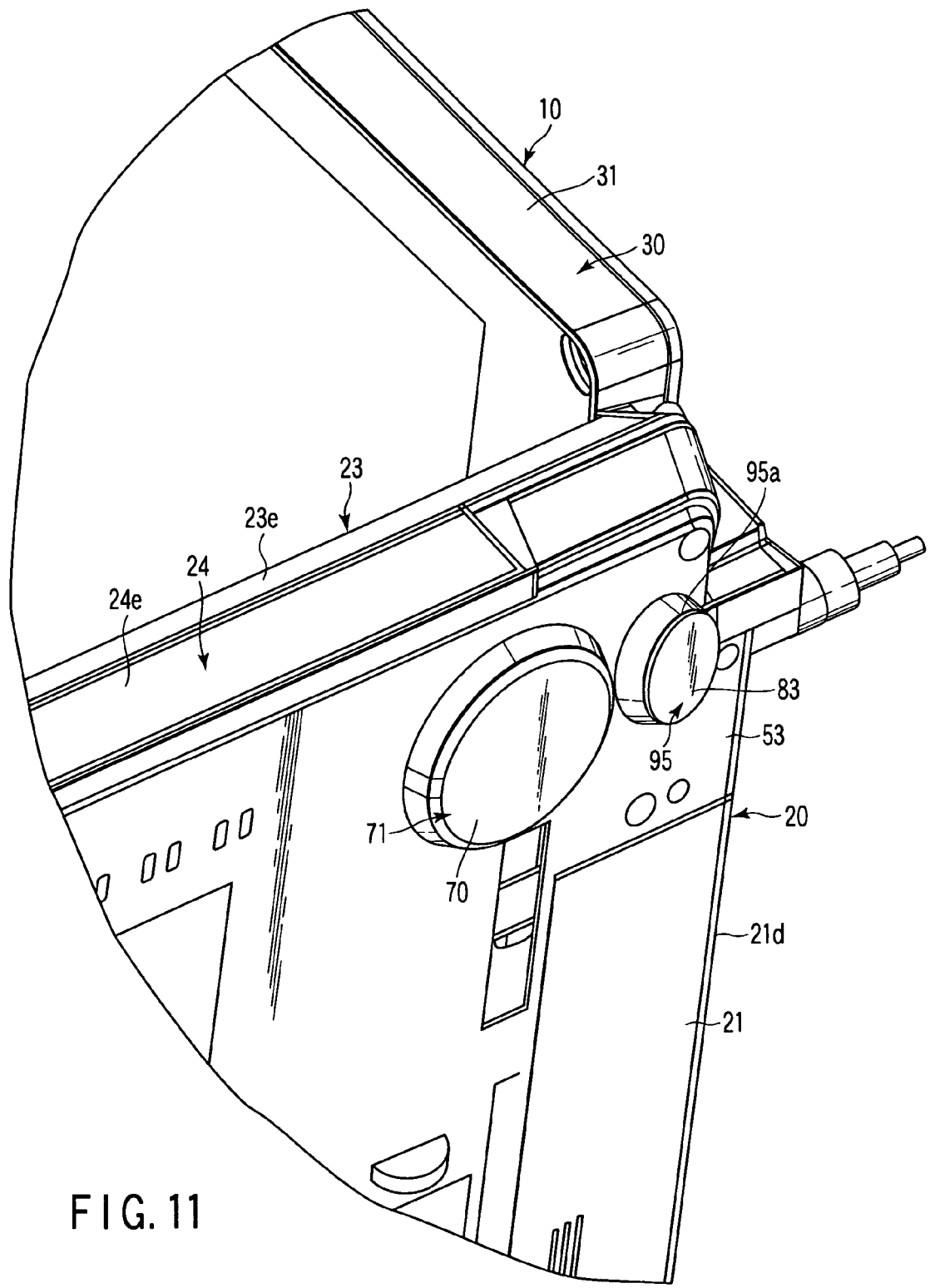
FIG. 11 is a perspective view of a bottom wall of a first casing of a portable computer according to a sixth embodiment of the present invention, as viewed from the outside.

FIG. 11 is a perspective view of a bottom wall 24a in the sixth embodiment, as viewed from the outside. As shown in FIG. 11, the foot portion 95 is formed, for example, between a right rim of the bottom wall 24a and the swelling portion 71. FIG. 12 is a cross-sectional view of a computer main body 20 through the swelling portion 71 and the foot portion 95, as viewed along a width direction.

Figure 12:
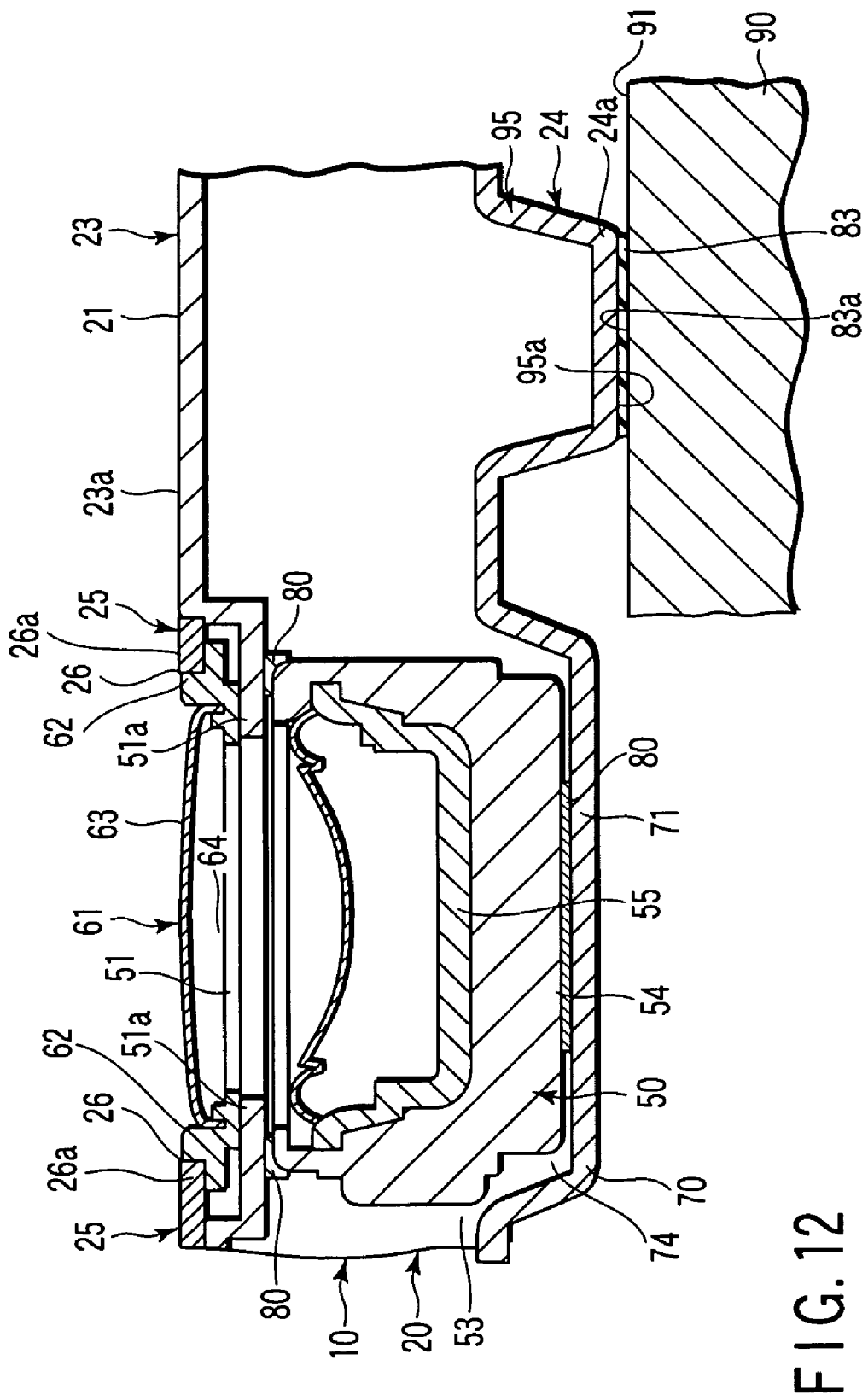
FIG. 12 is a cross-sectional view of the portable computer through a swelling portion and a foot portion shown in FIG. 11, as viewed along a width direction.

As shown in FIG. 12, the foot portion 95 is formed by, for example, part of the bottom wall 24a swelling downward. A rubber foot 83 is provided on an underside 95a of the foot portion 95. When the portable computer 10 is placed on a top side 91 of a table 90, a tip 83a of the rubber foot 83 projects most significantly toward the top side 91.

The present embodiment can also provides the same advantageous effects as those provided by the first embodiment.

In that the first to sixth embodiments, the cushioning materials 80 are provided between the first casing 11 and the speaker housing 54. However cushioning materials 80 may be provided between the speaker housing 54 and a member fixed on the first casing 11.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a speaker device including a speaker main body and a speaker housing which houses the speaker main body; and
   a casing which houses the speaker device and has a bottom wall, the bottom wall having a swelling portion that is formed at a rear portion of the bottom wall and houses an underside of the speaker housing, the underside of the speaker housing is opposite a side of the speaker device from which sound is emitted.

2. The electronic apparatus according to claim 1, wherein the swelling portion is formed by swelling part of the bottom wall.

3. The electronic apparatus according to claim 2, wherein
   a rubber foot is provided on at least part of a bottom of the swelling portion, and
   a tip of the rubber foot which faces a placement portion on which the casing is to be placed projects most significantly toward the placement portion when the casing is placed on the placement portion.

4. The electronic apparatus according to claim 3, wherein the rubber foot is provided over an entire area of the swelling portion.

5. The electronic apparatus according to claim 1, wherein the swelling portion is formed by providing a swelling member at a rim portion of a through hole provided in an area of the bottom wall in which the swelling portion is to be formed, the swelling member having a depression shape which opens upward and made of a rubber.

6. The electronic apparatus according to claim 5, wherein when the casing is placed on a placement portion on which the casing is placed, the swelling portion projects most significantly toward the placement portion.

7. The electronic apparatus according to claim 1, wherein a cushioning material is provided between the speaker housing and the casing or a member fixed on the casing.

8. The electronic apparatus according to claim 1, wherein a foot portion which projects downward is provided on the bottom wall of the casing.

9. The electronic apparatus according to claim 8, wherein
   a rubber foot is provided on a bottom of the foot portion, and
   a tip of the rubber foot which faces a placement portion on which the casing is placed projects most significantly toward the placement portion when the casing is placed on the placement portion.

10. The electronic apparatus according to claim 8, wherein the foot portion is formed by the casing which swells downward.

11. An electronic apparatus comprising:
    a speaker device including a speaker main body and a speaker housing that houses the speaker main body; and
    a casing including a base portion and a cover portion that covers the base portion, the base portion includes a bottom wall, the bottom wall being substantially planar except for a swelling portion formed at a location where the speaker housing is disposed, the swelling portion protrudes from the bottom wall toward a rear of the base portion and is sized to house a bottom portion of the speaker housing including an underside of the speaker housing that is opposite a side where sound is emitted from the speaker device.

12. The electronic apparatus according to claim 11, wherein the swelling portion is formed exclusively to partially house the speaker device.

13. The electronic apparatus according to claim 11, wherein a cushioning material is provided between the underside of the speaker housing and an inner surface of the swelling portion.

14. The electronic apparatus according to claim 11, wherein a foot portion is adapted for coupling to an underside of the swelling portion.

15. The electronic apparatus according to claim 11 further comprising:
    a rubber foot placed on the bottom wall adjacent to the swelling portion and protruding from the bottom wall a greater distance than that of the swelling portion protruding from the bottom wall.

16. An electronic apparatus comprising:
    a plurality of speaker devices, each speaker device of the plurality of speaker devices includes a speaker main body and a speaker housing that houses the speaker main body; and
    a casing including a cover portion and a base portion including a bottom wall, the cover portion covers the base portion, the bottom wall being substantially planar except for a plurality swelling portion formed toward a rear of the base portion at locations where the plurality of speaker devices are located, each swelling portion protrudes from the bottom wall and is sized to uniquely house a bottom portion of the speaker housing for one of the plurality of speaker devices, the bottom portion of the speaker housing including an underside of the speaker housing that is opposite a side where sound is emitted from the speaker device.

17. The electronic apparatus according to claim 16, wherein each of the plurality of swelling portions is formed exclusively to partially house one of the speaker devices.

18. The electronic apparatus according to claim 16, wherein a cushioning material is provided between the underside of the speaker housing and an inner surface of the swelling portion.

* * * * *